United States Patent [19]
Carter

[11] Patent Number: 5,717,658
[45] Date of Patent: Feb. 10, 1998

[54] TRAWLING SONAR SYSTEM

[75] Inventor: G. Clifford Carter, Waterford, Conn.

[73] Assignee: The United States of America as represented by the Secretary of the Navy, Washington, D.C.

[21] Appl. No.: 695,842

[22] Filed: Aug. 5, 1996

[51] Int. Cl.⁶ .................................................. H04R 17/00
[52] U.S. Cl. ................................................ 367/173; 367/153
[58] Field of Search .................................. 367/106, 130, 367/154, 131, 165, 173, 188, 153

[56] References Cited

U.S. PATENT DOCUMENTS

| 5,046,055 | 9/1991 | Ruffa | 367/154 |
| 5,657,296 | 8/1997 | Carter | 367/153 |

*Primary Examiner*—Daniel T. Pihulic
*Attorney, Agent, or Firm*—Michael J. McGowan; James M. Kasischke; Prithvi C. Lall

[57] ABSTRACT

Disclosed is a sonar system comprising a platform, axially extendable supports projecting from the platform, a flexible cable array deployed from the platform means through said support means, and an acoustic detector connected to the flexible cable. By increasing the physical aperture of the sonar system, performance is enhanced.

18 Claims, 3 Drawing Sheets

5,717,658

TRAWLING SONAR SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to acoustic wave systems and devices and more particularly to sonar systems employing multiple hydrophone cable systems.

2. Description of the Prior Art

The performance of a sonar is enhanced by increasing the physical aperture in horizontal, vertical or volumetric dimensions. Current sonars, such as, for example, commercial fishing sonars or medical ultra-sonic sonars either actively receive reflected acoustic signals or passively receive energy non-invasively radiated in the form of heat or acoustics by sources of interest. These sonars are limited in performance by the size of the passive or bi-static active receiving arrays. In complex environments, such as shallow water, the need for large aperture arrays, particularly vertical apertures, is more important, for naval purposes, than in deep water environments.

It is also desirable that sensor arrays which are nominally vertical when deployed at zero to low speed remain functional if not totally vertical at higher speeds. Although expensive multiple line towed arrays known as streamers have been used in the field of petroleum exploration to provide an extended aperture, such systems have constrained the towing vessel to a slow forward velocity.

A need, therefore, exists for a trawling sonar system which is capable of providing a large aperture and low drag underwater acoustic array for the receipt of underwater acoustic energy.

SUMMARY OF THE INVENTION

A first object of the invention is the provision of a sonar array having a large aperture.

Another object of this invention is to allow the use of multiple line towed arrays at a higher velocity.

Accordingly, the trawling sonar system of the present invention includes one or more extendable supports which are preferably telescoping members which project from a platform such as a vessel hull. Very-thin, low-cost, optical sonar towed arrays are deployed through the members and joined to a computer processing system. Additional components may include interfaces to other shipboard electronics and displays as well as conventional motors to reel in the optical arrays and conventional motors for cylinder extension and retraction. The primary acoustic sensors are the optical arrays deployed from the members. These optical arrays are nominally linear and nominally cylindrical very thin arrays which are linked to a central computer. Moreover, these arrays extend from the members and are deployed downward when the towing ship is stationary but stream aft from the member opening as towing speed increases. Embedded upon these members are additional hydrophones also linked to the central computer. For example, three to five of these extendable supports could extend at various lengths from the port side of a vessel and another three to five supports could protrude from the starboard side of a vessel. Groups of supports could fan out from a large disk-shaped handling subsystem. In another embodiment, the three to five sensor supports would also protrude downwardly from the handling subsystem. The computer processing can be located in the handling subsystem and in the deploying vessel. The handling subsystem can be located aft of a spherical sensor system in a submarine or in the sail of the submarine. Various operations might limit which of these supports is deployed and, accordingly, the operator can select which supports should be deployed. The wide horizontal coverage of the sensor supports allows accurate horizontal mine localization through the receipt of mono or bi-static sonar encoded pulses from the hydrophones and the optical arrays. Those skilled in the art will also appreciate that trawling struts can be provided to eliminate the risk of optical arrays becoming entangled or fouled in ship propellers during high speed operations. Moreover, optical towed arrays coupled with sophisticated beamforming and dynamic sensor position monitoring systems offer improved sonar performance at lower costs.

BRIEF DESCRIPTION OF THE DRAWINGS

The trawling sonar system of the present invention is further described with reference to the accompanying drawings in which.

DETAILED DESCRIPTION OF THE DRAWINGS

Figure 1:
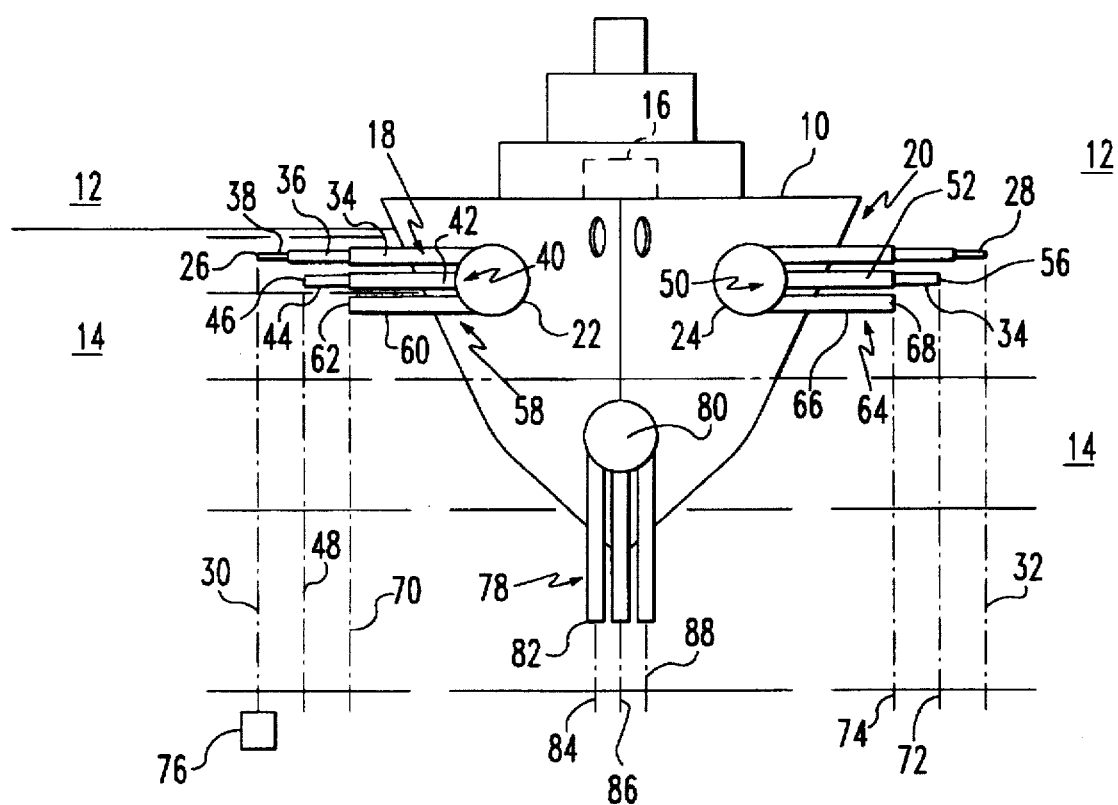
FIG. 1 shows a preferred embodiment of the sonar system of the present invention as is mounted on a surface ship which is shown in bow end view.

Referring to FIG. 1, the system includes a platform means which is the hull 10 of a surface ship which is positioned entirely in the water medium 14. An alternative embodiment is positioned between an air medium 12 and a water medium 14. The system, as is conventional in sonar systems, includes a central processing unit shown schematically at 16. The system also includes a plurality of lateral axially extendable supports as at 18 which extend from one side of the hull 10 and a plurality of lateral axially extendable supports as at 20 which extend from the opposite side of the hull 10. These supports 18 and 20 extend from disc shaped handling subsystems respectively at 22 and 24 and have terminal ends respectively at 26 and 28. From these terminal ends optical cables are shown respectively at 30 and 32 which extend downwardly into the water medium. These lateral axially extendable supports 18 and 20 are comprised of support members as at 34, 36 and 38. These support members 34, 36 and 38 are coaxial and have in respective order decreasing outer diameters such that the entire support is telescopically extendable by means of a conventional drive mechanism located in handling subsystems 22 and 24. Beneath the lateral support 18 there is positioned another axially extendable support 40 which is made up of coaxial support members 42 and 44 so as to be telescopically extendable, and from its terminal end 46 an optical cable 48 extends downwardly. Beneath the lateral support 20 there is another axially extendable lateral support 50 which is made up of coaxial support members 52 and 54 and which has a terminal end 56. Beneath the lateral support 40 there is still another lateral support 58 which includes a support member 60 having a terminal end 62. Beneath the lateral support 50 there is still another lateral support 64 which includes a support 66 having a terminal end 68. It will be understood that another optical cable 70 extends in nominally parallel adjacent relation to optical cables 30 and 48, and optical cables 72 and 74 similarly extend in adjacent parallel relation to optical cable 32. It will be understood that at least one hydrophone shown in enlarged schematic form as at 76 will be attached to each of the optical cables or the cable itself acts as a series of hydrophones modulated by a computer directed laser. It will be understood that each optical cable shown herein will also have at least one effective hydrophone attached to it although, for the sake of clarity, they are not shown in the drawings. Likewise, dynamic position monitoring means can be manufactured integral to each cable. From the bottom of the hull there are also vertical axially extendable supports as at 78 which extend downwardly from a disk shaped handling subsystem 80 to a terminal end 82. From this terminal end an optical cable 84 extends downwardly. Similarly, optical cables 86 and 88 extend downwardly in parallel adjacent relation from other vertical axially extendable supports.

Figure 2A:
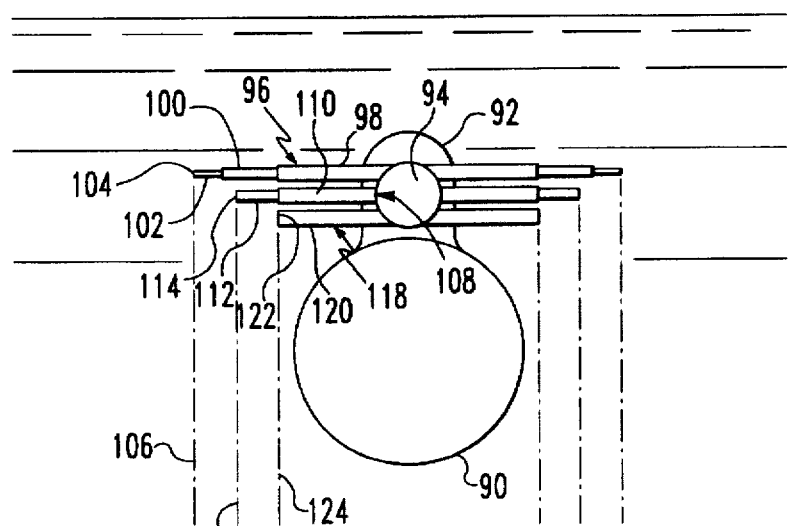
FIGS. 2A and 2B show an alternate preferred embodiment of the present invention as it is mounted on submarine hulls shown in bow end view.

Referring to FIG. 2A, another embodiment includes a submarine hull 90 submerged in water as a platform means. The submarine hull 90 has an upper sail 92 on which there is mounted a handling subsystem 94 from which lateral axially extendable supports 96 project. This lateral axially extendable support 96 is comprised of support members 98, 100 and 102. These support members 98, 100 and 102 are coaxial and have in respective order decreasing outer diameters such that the entire support 96 is telescopically extendable by means of a conventional drive mechanism located in handling subsystem 94. From a terminal end 104 of this support an optical cable 106 extends vertically downwardly. Beneath the lateral support 96 there is positioned another axially extendable support 108 which is made up of coaxial support members at 110 and 112 so as to be telescopically extendable, and from its terminal end 114 an optical cable extends 116 downwardly. Beneath the lateral support 108 there is still another lateral support 118 which includes a support member 120, and from terminal end 122, an optical cable 124 extends vertically downwardly. Supports on the opposite side of the sail 92 are similarly configured.

Figure 2B:
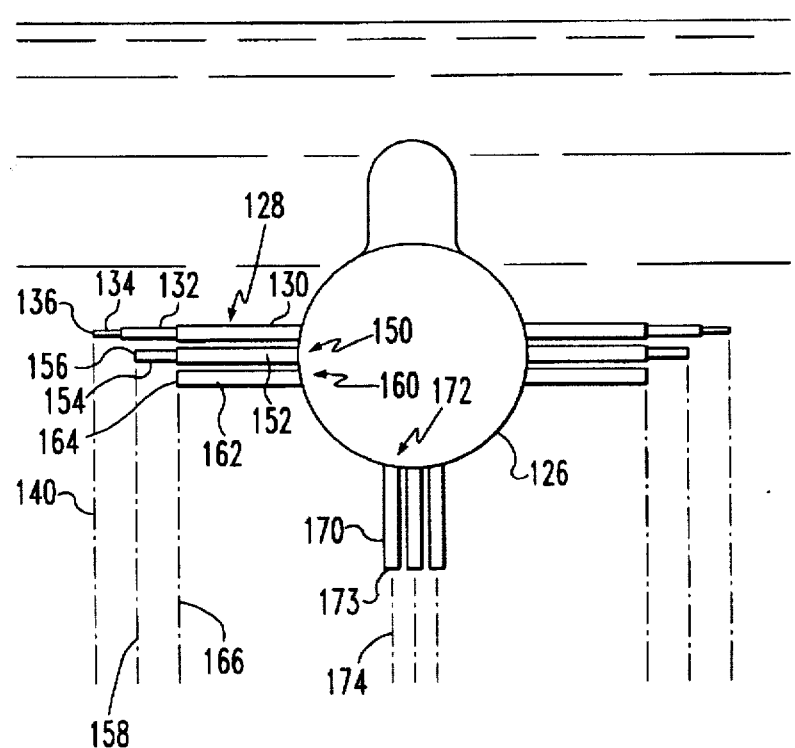

Referring to FIG. 2B, in another embodiment in which the platform means is a submarine hull 126, the lateral extended supports project directly from the hull 126 rather than the sail. It will be seen that lateral support 128 which is made up of coaxial telescopically extendable support members 130, 132 and 134 has a terminal end 136 from which there extends an optical cable 140. In a preferred embodiment, terminal end 136 extends three hull diameters out from hull 126. Beneath lateral support 128 is positioned an axially extendable support 150 which includes support members 152 and 154 in which has terminal end 156 from which optical cable 158 extends vertically downwardly. Beneath support 150 there is a support 160 which includes support member 162 and from terminal end 164 optical cable 166 extends downwardly there from. In this embodiment vertical supports as at 172 extend downwardly from the submarine hull. Terminal end 173 should extend three hull diameters below hull 126 to maximize the acoustic aperture. Such supports include support members 170 having terminal ends 173 from which optical cables 174 extend downwardly. It will be understood that the lateral supports on the port side of the hull operate in the same way as those described on the starboard side. Thus the horizontal extent is nominally seven hull diameters.

Figure 3A:
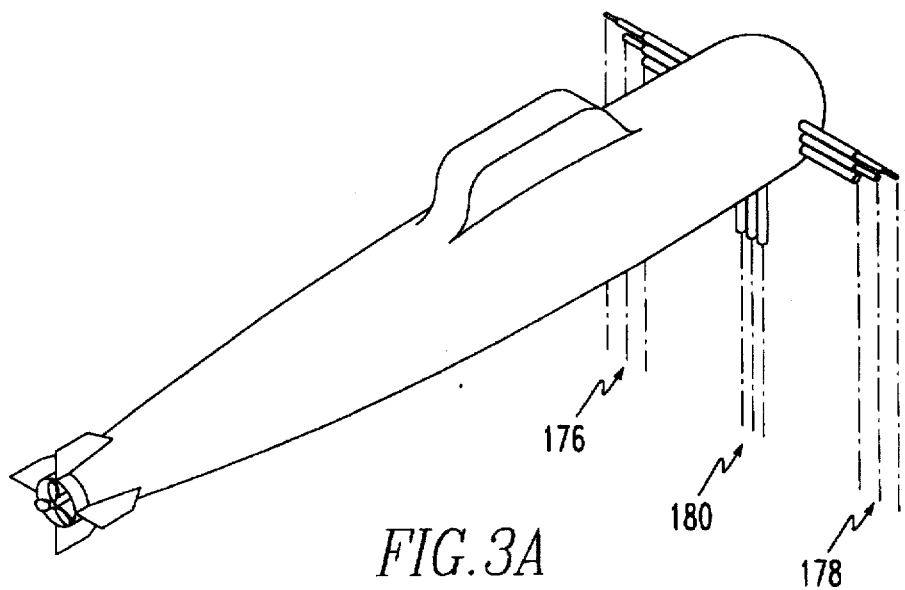
FIGS. 3A and 3B are perspective views of the system of FIG. 2B in which the submarine hull is shown in stationary and moving positions respectively.
Figure 3B:
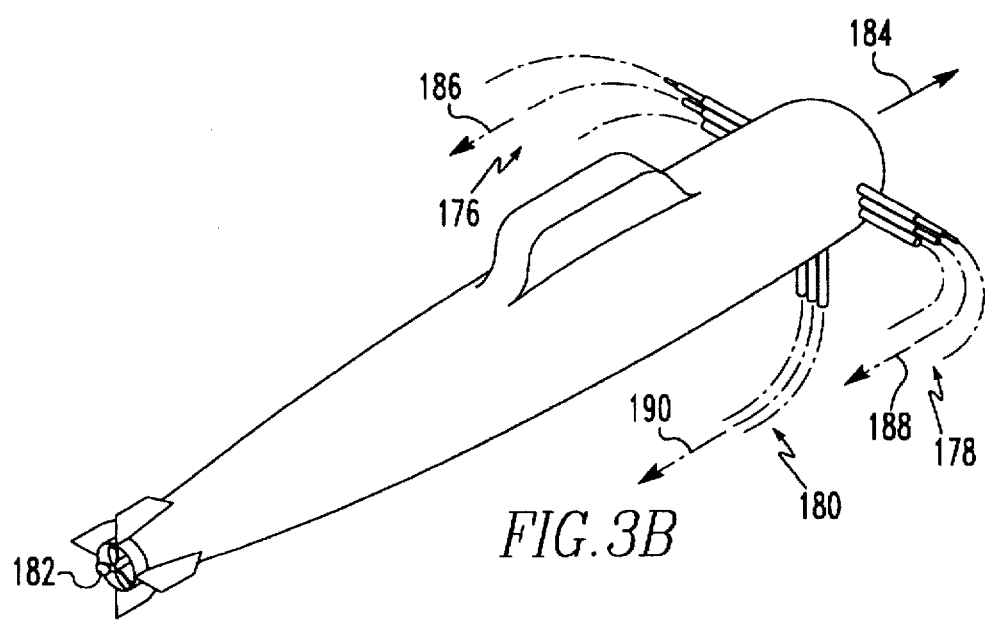

FIG. 3A presents a perspective view of the submarine of FIG. 2B in a stationary mode. It will be noted that the port optical cable array 176, starboard optical cable array 178 and central vertical optical cable array 180 extend vertically downwardly when the vessel is in this stationary position. Referring to FIG. 3B, when the vessel's propeller 182 is activated to move the vessel generally in the direction of its longitudinal axis 184, the groups of arrays 176, 178 and 180 are deployed to extend downwardly but also generally move rearwardly as at 186, 188 and 190 because of the flow field surrounding the submarine. The vertical nominally planar positions of the arrays shown in FIG. 3A are, however, approximated in the moving mode and a large planar, albeit distorted aperture is maintained in the moving mode.

It will be appreciated that a sonar system has been described which comprises a platform means, a plurality of support means projecting from the platform means, an array of flexible cables deployed from said platform means through said support means, means for detecting sounds or other radiant energy at a plurality of positions in said array and means for processing information received at said sound detection means.

It will be appreciated that there has been described a trawling sonar system which provides a large vertical, horizontal or volumetric aperture and underwater receiving arrays for improved detection, classification and localization of underwater sound sources. It will also be appreciated that the towed sonar system of the present invention allows for flexible deployment at a wide range of ship speeds from slow to fast, and which also allows for downward deployment which may be particularly advantageous, for example, from a fishing vessel near the surface, or for particularly advantageous lateral deployment from, for example, a torpedo, remotely piloted vehicle (RPV), mini-submarine or unmanned underwater mine hunting vehicle.

It will also be appreciated that the present invention also encompasses a method for increasing the physical aperture of a sonar system comprising the steps of positioning an array of flexible cables each having at least one sound detection means in spaced intervals from a platform means and processing information received at said sound detection means.

While the present invention has been described in connection with the preferred embodiments of the various elements, it is to be understood that other similar embodiments may be used or modifications and additions may be made to the present described embodiment for performing the same function of the present invention without deviating therefrom. Therefore, the present invention should not be limited to any single embodiment, but rather construed in breadth and scope in accordance with the recitation of the appended claims.

What is claimed is:

1. A sonar system comprising:
   a platform means;
   at least one support means projecting from said platform means;
   at least one flexible cable deployed from said platform means through each said support means, said support means providing support for said flexible cable in a lateral direction; and
   sound detection means connected to said flexible cable.

2. The sonar system of claim 1 wherein said support means is axially extendable.

3. The sonar system of claim 2 wherein the axially extendable support means comprises a plurality of coaxial telescoping members.

4. The sonar system of claim 1 wherein the cable is an optical cable.

5. The sonar system of claim 4 wherein the cable is positioned inside the support means.

6. The sonar system of claim 2 wherein a plurality of axially extendable support means project from the platform means.

7. The sonar system of claim 6 wherein a first group of said plurality of axially extendable support means project laterally from the platform means in a first lateral direction and a second group of said plurality of axially extendable support means project laterally from the platform means in an opposed second lateral direction.

8. The sonar system of claim 7 wherein at least some of the axially extendable support means project vertically from the platform means.

9. The sonar system of claim 6 wherein said at least one flexible cable comprises an optical cable.

10. The sonar system of claim 9 wherein the optical cables extend vertically downwardly from the terminal ends of the laterally projecting axially extendable support means.

11. The sonar system of claim 10 wherein the platform means is a hull of a surface ship.

12. The sonar system of claim 11 wherein the platform means is a hull of a surface ship and optical cables in the laterally projecting axially extendable support means extend from the terminal ends of said laterally projecting support means first into an air medium and then into a water medium.

13. The sonar system of claim 11 wherein the optical cables in the vertically projecting axially extendable support means extend directly into the water medium.

14. The sonar system of claim 10 wherein the platform means is a submarine hull.

15. The sonar system of claim 1 further comprising a processing unit joined in communication with said sound detection means.

16. The sonar system of claim 15 wherein said at least one flexible cable further comprises a position measuring means for determining the position of said flexible cable.

17. The sonar system of claim 16 wherein said sound detection means comprises optical hydrophones.

18. The sonar system of claim 17 further comprising at least one support hydrophone positioned on at least one support means.

* * * * *